(12) United States Patent
Chen et al.

(10) Patent No.: US 12,058,582 B2
(45) Date of Patent: Aug. 6, 2024

(54) COMMUNICATION METHOD, COMMUNICATIONS APPARATUS, AND STORAGE MEDIUM

(71) Applicant: HUAWEI TECHNOLOGIES CO., LTD., Shenzhen (CN)

(72) Inventors: Lei Chen, Beijing (CN); Bingzhao Li, Beijing (CN); Bin Xu, Beijing (CN); Xuelong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/242,671

(22) Filed: Apr. 28, 2021

(65) Prior Publication Data
US 2021/0266809 A1  Aug. 26, 2021

Related U.S. Application Data

(63) Continuation of application No. PCT/CN2019/112034, filed on Oct. 18, 2019.

(30) Foreign Application Priority Data

Nov. 1, 2018 (CN) .......................... 201811296965.4

(51) Int. Cl.
H04W 36/30 (2009.01)
H04W 36/08 (2009.01)
H04W 48/20 (2009.01)

(52) U.S. Cl.
CPC ........... H04W 36/30 (2013.01); H04W 36/08 (2013.01); H04W 48/20 (2013.01)

(58) Field of Classification Search
CPC ...... H04B 7/185; H04W 36/08; H04W 36/30; H04W 48/12; H04W 48/20; H04W 84/06
See application file for complete search history.

(56) References Cited

U.S. PATENT DOCUMENTS 6,233,451 B1    5/2001  Noerpel et al.
2003/0218995 A1* 11/2003 Kim .................. H04W 36/0066
                                                       370/318
(Continued)

FOREIGN PATENT DOCUMENTS

CN  101500278 A  8/2009
CN  102098715 A  6/2011
(Continued)

OTHER PUBLICATIONS

Qualcomm Incorporated, "Further consideration of SDAP header", 3GPP TSG-RAN WG2 Meeting #98, Hangzhou, China, May 15-19, 2017, R2-1705058, 2 pages.
(Continued)

Primary Examiner — Kashif Siddiqui
(74) Attorney, Agent, or Firm — Maier & Maier, PLLC

(57) ABSTRACT

A communication method, a communications apparatus, and a storage medium, used for a terminal device. The method includes: receiving system information from a first cell, where the system information includes first information; and performing cell selection or cell reselection based on the first information. In the embodiments, assistance information, such as a receiving capability of a network device or a sending capability of the terminal device, may be added to the system information. The assistance information includes the first information, so that when performing the cell selection or the cell reselection, the terminal device considers more determining conditions, to prevent some terminal devices with a low sending capability from camping on an NTN that cannot work.

16 Claims, 2 Drawing Sheets

(56) References Cited

U.S. PATENT DOCUMENTS

| | | | | |
|---|---|---|---|---|
| 2006/0135091 | A1* | 6/2006 | Ntsonde | H04W 4/029 |
| | | | | 455/12.1 |
| 2008/0194264 | A1* | 8/2008 | Eckert | H04W 68/02 |
| | | | | 455/445 |
| 2014/0011498 | A1* | 1/2014 | Aono | H04W 36/30 |
| | | | | 455/432.1 |
| 2014/0086203 | A1* | 3/2014 | Furuskar | H04L 5/0048 |
| | | | | 370/330 |
| 2014/0220978 | A1* | 8/2014 | Wu | H04W 48/10 |
| | | | | 455/436 |
| 2016/0219504 | A1 | 7/2016 | Cho et al. | |
| 2016/0234740 | A1 | 8/2016 | Kashiwase | |
| 2017/0238221 | A1* | 8/2017 | Santhanam | H04W 36/00837 |
| | | | | 370/331 |
| 2018/0295527 | A1* | 10/2018 | Guha | H04W 24/08 |
| 2019/0053144 | A1* | 2/2019 | Subramani | H04W 48/12 |
| 2021/0022054 | A1* | 1/2021 | Tsuda | H04W 48/16 |
| 2021/0029658 | A1* | 1/2021 | Mahalingam | H04W 56/0045 |
| 2021/0176656 | A1* | 6/2021 | Sang | H04W 24/10 |
| 2021/0266809 | A1* | 8/2021 | Chen | H04W 36/08 |

FOREIGN PATENT DOCUMENTS

| | | |
|---|---|---|
| CN | 105519188 A | 4/2016 |
| EP | 2117274 A1 | 11/2009 |
| EP | 2458920 A1 | 5/2012 |
| WO | 9913670 A1 | 3/1999 |
| WO | 2015034202 A1 | 3/2015 |

OTHER PUBLICATIONS

3GPP TS 23.501 V0.4.0 (Apr. 2017), "3rd Generation Partnership Project; Technical Specification Group Services and System Aspects; System Architecture for the 5G System; Stage 2(Release 15)", 124 pages.

Tno, Thales, Idle State Mobility Scenarios for Non-Terrestrial Networks. 3GPP TSG-RAN WG3 #101-Bis, Chengdu, China, Oct. 8-12, 2018, R3-185957, 5 pages.

* cited by examiner

COMMUNICATION METHOD, COMMUNICATIONS APPARATUS, AND STORAGE MEDIUM

CROSS-REFERENCE TO RELATED APPLICATIONS

This application is a continuation of International Application No. PCT/CN2019/112034, filed on Oct. 18, 2019, which claims priority to Chinese Patent Application No. 201811296965.4, filed on Nov. 1, 2018. The disclosures of the aforementioned applications are hereby incorporated by reference in their entireties.

TECHNICAL FIELD

Embodiments relate to communications technologies, and in particular, to a communication method, a communications apparatus, and a storage medium.

BACKGROUND

A conventional terrestrial network cannot provide seamless coverage for a terminal device, especially in places in which a base station cannot be deployed, such as a sea, a desert, or the air. Therefore, a non-terrestrial network (NTN) is introduced into a 5th generation (5G) communications system. The non-terrestrial network provides seamless coverage for the terminal device by deploying a network device or some functions of a network device on a high-altitude platform or a satellite. For example, in a non-terrestrial network deployed based on the satellite, the satellite covers the ground by using different beams, to provide seamless coverage for the terminal device. In subsequent implementation, a beam may be considered as a cell, and the terminal device camps on a cell through cell selection or cell reselection.

In consideration of particularity of deployment of the network device or some functions of the network device in the non-terrestrial network, even if the terminal device accesses a cell of the network device according to an existing cell selection/reselection criterion, normal communication cannot be performed. That is, in a conventional technology, there is no cell selection or cell reselection procedure for the non-terrestrial network.

SUMMARY

Embodiments provide a communication method, a communications apparatus, and a storage medium, to perform cell selection or cell reselection for a non-terrestrial network and ensure normal communication between a terminal device and a network device.

According to a first aspect, an embodiment provides a communication method applied to a terminal device. The method includes: receiving system information from a first cell, where the system information includes first information; and performing cell selection or cell reselection based on the first information.

For example, assistance information, such as a receiving capability of a network device or a sending capability of the terminal device, may be added to the system information. The assistance information includes the first information, so that when performing the cell selection or the cell reselection or performing other processing, the terminal device considers more determining conditions, to prevent some terminal devices with a low sending capability from camping on an NTN that cannot work. A solution for performing cell selection or cell reselection for a non-terrestrial network is provided, to ensure normal communication between the terminal device and the network device.

Optionally, the first information may include at least one of the following:
   a minimum received signal power corresponding to the first cell;
   an uplink transmit power threshold corresponding to the first cell;
   a characteristic of the first cell; and
   neighboring cell information of the first cell, and the like In a possible implementation, the first information includes the minimum received signal power corresponding to the first cell. In this case, the performing cell selection based on the first information may include: determining whether a maximum transmit power of the terminal device is not less than (or greater than or equal to) a sum of the minimum received signal power corresponding to the first cell and a first threshold. Optionally, if the maximum transmit power of the terminal device is not less than (or greater than or equal to) the sum of the minimum received signal power corresponding to the first cell and the first threshold, the first cell is determined as a camped cell. Alternatively, if the maximum transmit power of the terminal device is less than or equal to (or not greater than) the sum of the minimum received signal power corresponding to the first cell and the first threshold, the first cell is determined as a non-camped cell, that is, the first cell is abandoned. The first threshold is determined based on first path loss information, and the first path loss information is path loss information corresponding to the first cell. Further, optionally, the first path loss information is determined by the terminal device.

In a possible implementation, the first information includes the uplink transmit power threshold corresponding to the first cell. In this case, the performing cell selection based on the first information may include: determining whether a maximum transmit power of the terminal device is greater than or equal to the uplink transmit power threshold corresponding to the first cell, or determining whether a maximum transmit power of the terminal device is less than the uplink transmit power threshold corresponding to the first cell. Optionally, if the maximum transmit power of the terminal device is greater than or equal to the uplink transmit power threshold corresponding to the first cell, the first cell is determined as a camped cell. Alternatively, if the maximum transmit power of the terminal device is less than the uplink transmit power threshold corresponding to the first cell, the first cell is determined as a non-camped cell, that is, the first cell is abandoned. In another possible implementation, in a scenario in which a maximum transmit power is equal to the uplink transmit power threshold corresponding to the first cell, the first cell may also be determined as a non-camped cell.

In a possible implementation, the first information includes the characteristic of the first cell. In this case, the performing cell selection based on the first information may include: determining whether the terminal device supports the characteristic of the first cell. Optionally, if the terminal device supports the characteristic of the first cell, the first cell is determined as a camped cell. Alternatively, if the terminal device does not support the characteristic of the first cell, the first cell is determined as a non-camped cell, that is, the first cell is abandoned. Further, a height at which the network device is located is used as an example. If the terminal device supports the height at which the network device is located and that corresponds to the first cell, the first cell is determined as the camped cell. Alternatively, a platform on which the network device is located is an unmanned aircraft system (UAS), or a platform on which the network device is located is of a UAS type. If the terminal device supports the UAS, the first cell is determined as the camped cell.

Optionally, the neighboring cell information may include at least one of the following:
- a minimum received signal power corresponding to a second cell;
- an uplink transmit power threshold corresponding to the second cell; and
- a characteristic of the second cell, where
the second cell is a neighboring cell of the first cell.

In a possible implementation, the neighboring cell information includes the minimum received signal power corresponding to the second cell. In this case, the performing cell reselection based on the first information may include: determining whether a maximum transmit power of the terminal device is greater than or equal to a sum of the minimum received signal power corresponding to the second cell and a second threshold. Optionally, if the maximum transmit power of the terminal device is not less than (or greater than or equal to) the sum of the minimum received signal power corresponding to the second cell and the second threshold, the cell reselection may be performed to the second cell. Alternatively, if the maximum transmit power of the terminal device is less than or equal to (or not greater than) the sum of the minimum received signal power corresponding to the second cell and the second threshold, the second cell is not used as a candidate cell for the terminal device to perform the cell reselection, that is, the second cell is abandoned. The second threshold is determined based on second path loss information, and the second path loss information is path loss information corresponding to the second cell. Further, optionally, the second path loss information is determined by the terminal device.

In a possible implementation, the neighboring cell information includes the uplink transmit power threshold corresponding to the second cell. In this case, the performing cell reselection based on the first information may include: determining whether a maximum transmit power of the terminal device is greater than or equal to the uplink transmit power threshold corresponding to the second cell, or determining whether a maximum transmit power of the terminal device is less than the transmit power threshold corresponding to the second cell. Optionally, if the maximum transmit power of the terminal device is greater than or equal to the uplink transmit power threshold corresponding to the second cell, the cell reselection may be performed to the second cell. Alternatively, if the maximum transmit power of the terminal device is less than the uplink transmit power threshold corresponding to the second cell, the second cell is not used as a candidate cell for the terminal device to perform the cell reselection, that is, the second cell is abandoned.

In a possible implementation, the neighboring cell information includes the characteristic of the second cell. In this case, the performing cell reselection based on the first information may include: determining whether the terminal device supports the characteristic of the second cell. Optionally, if the terminal device supports the characteristic of the second cell, the cell reselection may be performed to the second cell. Alternatively, if the terminal device does not support the characteristic of the second cell, the terminal device does not use the second cell as a candidate cell to perform the cell reselection, that is, the second cell is abandoned.

Further, the performing cell selection based on the first information may further include: determining whether the first cell meets a first criterion. Further, if the first cell meets the first criterion and the terminal device meets a requirement in any one of the foregoing implementations, the first cell is determined as a camped cell. Otherwise, the first cell is abandoned. The requirement in any one of the foregoing implementations may include any one of the following: the maximum transmit power of the terminal device is greater than or equal to the uplink transmit power threshold corresponding to the first cell, the terminal device supports the characteristic of the first cell, and the maximum transmit power of the terminal device is greater than or equal to (or not less than) the sum of the minimum received signal power corresponding to the first cell and the first threshold.

Optionally, the first criterion is an S criterion. For related descriptions of the S criterion, refer to descriptions in a conventional technology or content of the embodiments. Optionally, the first criterion may be another criterion used to determine whether to perform the cell selection. Content of the first criterion is not limited in this embodiment. The first criterion is introduced to clarify that in addition to the first information, there is another determining criterion used for performing the cell selection.

Further, the performing cell reselection based on the first information may further include: determining whether the second cell meets a second criterion. Further, if the second cell meets the second criterion, and the terminal device meets the requirement in any one of the foregoing embodiments, the cell reselection is performed to the second cell. Otherwise, the second cell is abandoned. The requirement in any one of the foregoing embodiments may include any one of the following: the maximum transmit power of the terminal device is greater than or equal to the uplink transmit power threshold corresponding to the second cell, the terminal device supports the characteristic of the second cell, and the maximum transmit power of the terminal device is not less than (or greater than or equal to) the sum of the minimum received signal power corresponding to the second cell and the second threshold.

Optionally, the second criterion is an existing reselection criterion. For related descriptions of the existing reselection criterion, refer to descriptions in the conventional technology or content of the embodiments. Details are not described herein again. Optionally, the second criterion may be another criterion used to determine whether to perform the cell reselection. Content of the second criterion is not limited in this embodiment. The second criterion is introduced to clarify that in addition to the first information, there is another determining criterion used for performing the cell reselection.

In addition, the system information may include second information. The second information may include at least one of the following: first indication information and second indication information. The first indication information is used to indicate whether access of a first-type terminal device to the first cell is supported, the second indication information is used to indicate a status of the first cell, and the status of the first cell indicates whether the first cell is a reserved cell. Optionally, the terminal device is the first-type terminal device. Optionally, the first information and the second information may be carried in same system information, or the first information and the second information may be carried in different system information. This is not limited in this embodiment.

In a possible implementation, the second information includes the first indication information, and the first indication information indicates that the access of the first-type terminal device to the first cell is supported; and/or the second information includes the second indication information, and the second indication information indicates that the first cell is a non-reserved cell or is not the reserved cell.

Alternatively, based on the foregoing descriptions, the system information may include third information, and the third information includes at least one of the following: third indication information and fourth indication information. The third indication information is used to indicate whether access of the first-type terminal device to a second cell is supported, the fourth indication information is used to indicate a status of the second cell, and the status of the second cell indicates whether the second cell is a reserved cell. Optionally, the first information and the third information, or the second information and the third information may be carried in same system information, or may be carried in different system information. This is not limited in this embodiment. Optionally, the first-type terminal device is a conventional terminal device, in other words, a terminal device that does not support the NTN.

In a possible implementation, the third information includes the third indication information, and the third indication information indicates that the access of the first-type terminal device to the second cell is supported; and/or the third information includes the fourth indication information, and the fourth indication information indicates that the second cell is a non-reserved cell or is not the reserved cell.

According to a second aspect, an embodiment provides a communication method, applied to a network device. The method includes: sending system information, where the system information includes first information. It may be understood that the communication method in the second aspect is a peer-end solution corresponding to the communication method in the first aspect. For a principle or a function of the communication method in the second aspect, refer to the first aspect. Details are not described herein again.

Optionally, the first information may include at least one of the following: a minimum received signal power corresponding to the first cell; an uplink transmit power threshold corresponding to the first cell; a characteristic of the first cell; and neighboring cell information of the first cell.

The neighboring cell information may include at least one of the following: a minimum received signal power corresponding to a second cell; an uplink transmit power threshold corresponding to the second cell; and a characteristic of the second cell, where the second cell is a neighboring cell of the first cell.

Optionally, the system information may include second information, and the second information may include at least one of the following: first indication information and second indication information, where the first indication information is used to indicate whether access of a first-type terminal device to the first cell is supported, the second indication information is used to indicate a status of the first cell, and the status of the first cell indicates whether the first cell is a reserved cell.

In an implementation, the first information includes the first indication information, and the first indication information indicates that the access of the first-type terminal device to the first cell is supported; and/or the first information includes the second indication information, and the second indication information indicates that the first cell is a non-reserved cell or is not the reserved cell.

Further, the system information may include third information, and the third information may include at least one of the following: third indication information and fourth indication information. The third indication information is used to indicate whether access of the first-type terminal device to a second cell is supported, the fourth indication information is used to indicate a status of the second cell, and the status of the second cell indicates whether the second cell is a reserved cell.

In an implementation, the third information includes the third indication information, and the third indication information indicates that the access of the first-type terminal device to the second cell is supported; and/or the third information includes the fourth indication information, and the fourth indication information indicates that the second cell is a non-reserved cell or is not the reserved cell.

According to a third aspect, an embodiment provides a communications apparatus, used in a terminal device. The apparatus includes a transceiver module and a processing module. The transceiver module is configured to receive system information from a first cell, where the system information includes first information. The processing module is configured to perform cell selection or cell reselection based on the first information.

Optionally, the first information may include at least one of the following:
  a minimum received signal power corresponding to the first cell;
  an uplink transmit power threshold corresponding to the first cell;
  a characteristic of the first cell; and
  neighboring cell information of the first cell, and the like In an implementation, the first information includes the minimum received signal power corresponding to the first cell. When being configured to perform the cell selection based on the first information, the processing module may be configured to: determine whether a maximum transmit power of the terminal device is greater than or equal to (or not less than) a sum of the minimum received signal power corresponding to the first cell and a first threshold. The first threshold is determined based on first path loss information, and the first path loss information is path loss information corresponding to the first cell.

In an implementation, the first information includes the uplink transmit power threshold corresponding to the first cell. When being configured to perform the cell selection based on the first information, the processing module may be configured to: determine whether a maximum transmit power of the terminal device is greater than or equal to the uplink transmit power threshold corresponding to the first cell or determine whether a maximum transmit power of the terminal device is less than the uplink transmit power threshold corresponding to the first cell.

In an implementation, the first information includes the characteristic of the first cell. When being configured to perform the cell selection based on the first information, the processing module may be configured to: determine whether the terminal device supports the characteristic of the first cell.

Optionally, the neighboring cell information may include at least one of the following:
  a minimum received signal power corresponding to a second cell;
  an uplink transmit power threshold corresponding to the second cell; and
  a characteristic of the second cell, and the like, where the second cell is a neighboring cell of the first cell.

In an implementation, the neighboring cell information includes the minimum received signal power corresponding to the second cell. When being configured to perform the cell reselection based on the first information, the processing module may be configured to: determine whether a maximum transmit power of the terminal device is greater than or equal to a sum of the minimum received signal power corresponding to the second cell and a second threshold. The second threshold is determined based on second path loss information, and the second path loss information is path loss information corresponding to the second cell.

In an implementation, the neighboring cell information includes the uplink transmit power threshold corresponding to the second cell. When being configured to perform the cell reselection based on the first information, the processing module may be configured to: determine whether a maximum transmit power of the terminal device is greater than or equal to the uplink transmit power threshold corresponding to the second cell, or determine whether a maximum transmit power of the terminal device is less than the uplink transmit power threshold corresponding to the second cell.

In an implementation, the neighboring cell information includes the characteristic of the second cell. When being configured to perform the cell reselection based on the first information, the processing module may be configured to: determine whether the terminal device supports the characteristic of the second cell.

Further, when being configured to perform the cell selection based on the first information, the processing module may be further configured to determine whether the first cell meets a first criterion. The first criterion is, for example, an existing S criterion.

Alternatively, when being configured to perform the cell reselection based on the first information, the processing module may be further configured to determine whether the second cell meets a second criterion. The second criterion is, for example, an existing reselection criterion.

On the foregoing basis, the system information may include second information, and the second information may include at least one of the following: first indication information and second indication information, where the first indication information is used to indicate whether access of a first-type terminal device to the first cell is supported, the second indication information is used to indicate a status of the first cell, and the status of the first cell indicates whether the first cell is a reserved cell.

Optionally, the second information includes the first indication information, and the first indication information indicates that the access of the first-type terminal device to the first cell is supported; and/or the second information includes the second indication information, and the second indication information indicates that the first cell is a non-reserved cell or is not the reserved cell.

It should be understood that the terminal device may be the first-type terminal device.

According to a fourth aspect, an embodiment provides a communications apparatus used in a network device. The apparatus includes: a transceiver module, configured to send system information, where the system information includes first information. It may be understood that the communications apparatus in the fourth aspect is an apparatus solution corresponding to the communication method in the second aspect. For a principle or a function of the communications apparatus, refer to the second aspect. Details are not described herein again.

According to a fifth aspect, an embodiment provides a communications apparatus. The apparatus includes a memory and a processor. The memory stores a computer program that can be executed by the processor. When the computer program is executed by the processor, the method according to either of the first aspect and the second aspect is implemented.

Optionally, the communications apparatus is a terminal device or a network device.

According to a sixth aspect, an embodiment provides a computer-readable storage medium, where the computer-readable storage medium stores a computer program, the computer program includes at least one segment of code, and the at least one segment of code may be executed by a processor, so that a computer implements the method according to either of the first aspect and the second aspect.

According to a seventh aspect, an embodiment provides a program. When the program is executed by a computer, the method according to either of the first aspect and the second aspect is implemented.

All or some of the foregoing programs may be stored in a storage medium that is encapsulated with a processor, or all or some of the foregoing programs may be stored in a memory that is not encapsulated with a processor.

Optionally, the processor may be a chip.

According to an eighth aspect, an embodiment provides a computer program product, including program instructions, where the program instructions are used to be executed to implement any one of the foregoing methods.

According to a ninth aspect, an embodiment provides a chip, including a processing module and a communications interface. The processing module cooperates with the communications interface to perform any one of the foregoing methods.

Further, the chip further includes a storage module (for example, a memory). The storage module is configured to store instructions, the processing module is configured to execute the instructions stored in the storage module, and the instructions stored in the storage module are executed to perform any one of the foregoing methods.

The foregoing and other aspects of the embodiments are clearer and easier to understand in descriptions of the following (a plurality of) embodiments.

DETAILED DESCRIPTION OF THE EMBODIMENTS

It should be understood that the term "and/or" describes only an association relationship for describing associated objects and represents that three relationships may exist. For example, A and/or B may represent the following three cases: only A exists, both A and B exist, and only B exists.

Embodiments may be applied to a 5G system and a derivative system of the 5G system. The 5G system includes, for example, a 5G NR (new radio) system. The embodiments may be further applied to another communications system, provided that there is an entity that sends indication information of a transmission direction and a receiving entity of the indication information in the communications system, and the receiving entity determines the data transmission direction within a specific time period based on the indication information.

Figure 1:
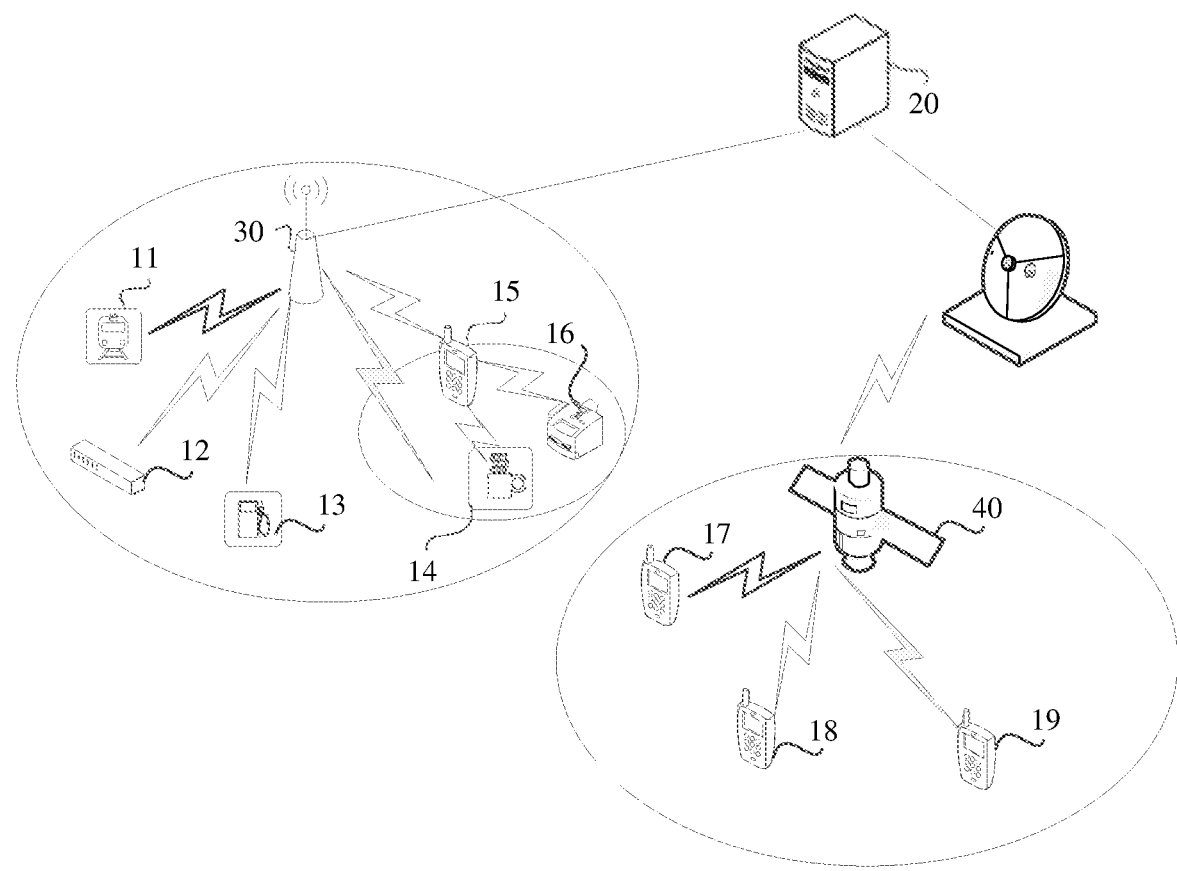
FIG. 1 is a schematic diagram of a communications system according to an embodiment.

As shown in FIG. 1, the communications system includes a core network device 20, a base station 30, a satellite station 40, and a plurality of terminal devices: a terminal device 11 to a terminal device 19. In the communications system, the terminal device 11 to the terminal device 16 may send uplink data to the base station 30. Correspondingly, the base station 30 receives the uplink data sent by the terminal device 11 to the terminal device 16. Similarly, the base station 30 may send downlink data to the terminal device 11 to the terminal device 16. Correspondingly, the terminal device 11 to the terminal device 16 receive the downlink data from the base station 30. In addition, the terminal device 14 to the terminal device 16 may also form a communications subsystem. In the communications subsystem, the base station 30 may send downlink data to the terminal device 11, the terminal device 12, the terminal device 15, and the like. The terminal device 15 may also send downlink data to the terminal device 14 and the terminal device 16. The terminal device 17 to the terminal device 19 may send uplink data to the satellite station 40, and the satellite station 40 may receive the uplink data sent by the terminal device 17 to the terminal device 19. Similarly, the satellite station 40 may send downlink data to the terminal device 17 to the terminal device 19, and the terminal device 17 to the terminal device 19 receive the downlink data from the satellite station 40. In addition, the base station 30 and the satellite station 40 may be connected to the core network device 20 in different manners, and the base station 30 and the satellite station 40 each may perform data sending and receiving with the core network device 20.

It should be understood that the communications system shown in FIG. 1 may include a plurality of satellite stations or a plurality of base stations, and the satellite stations may also serve terminal devices similar to the terminal device 11 to the terminal device 16. The term "a plurality of" means two or more.

The embodiments are described with reference to a network device and a terminal device. The network device and the terminal device may work on a licensed frequency band or an unlicensed frequency band.

The network device, which is also referred to as a radio access network (RAN) device, is a device that connects the terminal device to a wireless network and may be configured to transmit or receive a signal. For example, the network device may be a base station in a 5G network, for example, a transmission reception point (TRP), a controller, or a gNB. This is not limited herein. An area covered by the network device (or all signals of the network device) or a part of signals of the network device is a cell, and the network device may communicate with a terminal device within a range of the cell. Further, one network device may cover one or more cells. The cell is a logical concept.

It may be understood that in the embodiments, the terminal device may also be referred to as user equipment (UE), and the terminal device may be configured to transmit or receive a signal. The terminal device may be a wireless terminal device or a wired terminal device. The wireless terminal device may be a device with a wireless transceiver function. The wireless terminal device may be deployed on a land, and includes an indoor device or an outdoor device, a hand-held device, or a vehicle-mounted device. The wireless terminal device may also be deployed on a water surface (for example, a steamship). The wireless terminal device may also be deployed in the air (for example, an airplane, a balloon, or a satellite). The terminal device may be a mobile phone, a tablet (or "pad"), a computer with the wireless transceiver function, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, or the like. This is not limited herein.

In a conventional terrestrial network, because a cell radius is limited, even if the terminal device is located at a cell edge, a transmit power of the terminal device can still be used to transmit uplink data to the network device provided that an S criterion is met. However, in a non-terrestrial network, because the network device is located at a relatively high height, especially a network device in a geostationary satellite orbit (GEO), a vertical height from the network device to the ground reaches 35,786 kilometers, and a signal loss is relatively high. Consequently, uplink data sent by some terminal devices cannot be transmitted to the network device. In this case, even if the terminal device accesses a cell of the network device according to an existing cell selection criterion or an existing cell reselection criterion, the terminal device cannot communicate with the network device. Consequently, an existing solution in which downlink signal quality of a cell is used as a basis for determining cell selection or cell reselection is not applicable to the non-terrestrial network.

A type of the cell selection includes initial cell selection and cell selection based on stored information. Regardless of the type of the cell selection, an existing cell selection principle, that is, the S criterion, needs to be complied with. The terminal device is allowed to camp on a cell when an S value Srxlev of the cell selection is greater than 0.

$$Srxlev = Qrxlevmeas - (Qrxlevmin + Qrxlevminoffset) - Pcompensation - Qoffsettem$$

In the foregoing formula,

Qrxlevmeas is a reference signal received power (reference signal receiving power, RSRP) value of a measured cell;

Qrxlevmin is a minimum RSRP receiving strength requirement in the cell and is obtained from a broadcast message;

Qrxlevminoffset is an offset of a minimum access level to prevent ping-pong reselection;

Pcompensation is a compensation value, Pcompensation=MAX(Pemax−Pumax, 0), and is a maximum value between 0 and a difference between a configured value and an actual uplink transmit power of the terminal device; and Qoffsettem is a temporary offset value and is notified in a system broadcast.

Existing Cell Reselection Criterion

In a long term evolution (LTE) system, cell reselection refers to a process in which a terminal device monitors, in an idle mode, signal quality of a neighboring cell and a current cell, to select a best cell to provide a service signal. When the signal quality and a level of the neighboring cell meet the foregoing S criterion, and meet a specific reselection decision criterion, the terminal device accesses and camps on the cell.

After successfully camping on the cell, the terminal device continuously measures the cell. A radio resource control (RRC) layer calculates Srxlev (S criterion) based on an RSRP measurement result and compares Srxlev obtained through calculation with Sintrasearch (an intra-frequency measurement start threshold) and Snonintrasearch (an inter-frequency/inter-RAT measurement start threshold). A comparison result is used as a decision condition for determining whether to start neighboring cell measurement. After a cell meets the decision condition of the neighboring cell measurement, the terminal device performs intra-frequency or inter-frequency measurement on the cell, obtains one or more candidate cells based on one or more measurement results, and then sorts the candidate cells according to specific criteria, to obtain a reselected target cell. Details about the criteria are as follows.

Cell Reselection Measurement Criterion

1. When a priority indicated in a system message is higher than that of a serving cell, the terminal device measures high-priority cells.

2. For an intra-frequency/a same-priority cell, if an S value of a serving cell is less than or equal to Sintrasearch (the intra-frequency measurement start threshold), the terminal device performs measurement; if an S value of a serving cell is greater than Sintrasearch, the terminal device does not perform measurement.

3. When a priority indicated in a system message is lower than that of a serving cell, if an S value of the serving cell is less than or equal to Snonintrasearch (the inter-frequency/inter-RAT measurement start threshold), the terminal device performs measurement; if an S value of the serving cell is greater than Snonintrasearch, the terminal device does not perform measurement.

4. If the Snonintrasearch parameter is not broadcast in a system message, the terminal device starts inter-frequency cell measurement.

It may be noted that the S value is Srxlev (S criterion) in cell selection. The formula is as follows: Srxlev=Qrxlevmeas−(qRxLevMin+qRxLevMinOffset)−pCompensation, and S criterion=an RSRP value of a measured cell−{Minimum receive level (usually 0 to 128 dBm)+Minimum receive level offset (usually 0)}−Power compensation (usually 0).

Cell Reselection Criterion:

If a plurality of adjacent cells (such as neighboring cells) on a highest-priority frequency meet conditions, the best cell on the highest-priority frequency is selected. For cells on a same-priority (or an intra-frequency) frequency, an R criterion for intra-frequency cell reselection is used.

For cell reselection on a high-priority frequency, the following conditions need to be met:

1. The terminal device camps on an original cell for more than 1 second (s).

2. An S value of a cell on the high-priority frequency is greater than a preset threshold (ThreshXHigh: a high-priority reselection threshold), and duration exceeds a reselection time parameter T.

For cell reselection on the intra-frequency or the same-priority frequency, the following conditions need to be met:

1. The terminal device camps on an original cell for more than 1 s.

2. No cell on a high-priority frequency meets the reselection conditions.

3. An S value of an intra-frequency or a same-priority cell is less than or equal to a preset threshold (Sintrasearch: the intra-frequency measurement start threshold), and R criterion (Rt>Rs) is met for duration T.

For cell reselection on a low-priority frequency, the following conditions need to be met:

1. The terminal device camps on an original cell for more than 1 s.

2. No cell on a high-priority (or a same-priority) frequency meets the reselection conditions.

3. An S value of a serving cell is less than a preset threshold (ThrshServLow: a serving frequency lower-priority reselection threshold), and an S value of a cell on the low-priority frequency is greater than a preset threshold (ThreshXLow: a low-priority reselection threshold), and duration exceeds a reselection time parameter value.

Cell Reselection Priority Handling Principle:

The terminal device may obtain frequency priority information (a common priority) by using a broadcast message, or obtain frequency priority information by using an RRC connection release message. If a dedicated priority is provided in the message, the terminal device ignores all common priorities. If a system message does not provide priority information of a cell on which the terminal device currently camps, the terminal device sets a priority of a frequency of the cell to the lowest priority. The terminal device performs cell reselection according to a priority policy only between frequencies that appear in the system message and of which priorities are provided in the system message.

It should be noted that an inter-frequency cell reselection priority ranges from 0 to 7, where 0 indicates the lowest priority.

R criterion (where duration is T, and Rt>Rs):

For an intra-frequency cell or an inter-frequency cell with a same priority, the terminal device performs cell reselection and sorting by using an R criterion. The R criterion is that if Rt (a target cell) continuously exceeds Rs (a serving cell) within Treselection time (where Treselection in the intra-frequency cell and the inter-frequency cell may be different), the cell reselection is performed by the terminal device to the target cell.

$$Rs = Q\text{meas},s + Q\text{hyst} \qquad \text{Serving cell:}$$

$$Rt = Q\text{meas},t - Q\text{offset} \qquad \text{Target cell:}$$

Details are as follows.

Qmeas,s is a measured RSRP value of the serving cell;

Qhyst is a cell reselection hysteresis value;

Qmeas,t is a measured RSRP value of the target cell; and

Qoffset is a cell offset.

It should be understood that content of the cell selection and the cell reselection described above is merely an explanation based on a conventional technology. With system evolution and technology development, specific steps, parameters, and criteria for the cell selection and the cell reselection may change. Therefore, in the following embodiments, a "first criterion" and a "second criterion" are used to represent the foregoing explanations of the criteria related to the cell selection and the cell reselection in the conventional technology. Further, all solutions that are modified or adjusted based on the foregoing descriptions or the conventional technology to adapt to a technology change or standard evolution are applicable to the "first criterion" and the "second criterion" and fall within the scope of the embodiments.

Based on the foregoing descriptions, the embodiments provide a communication method, a communications apparatus, and a storage medium, so that during cell selection or cell reselection, a transmit power (capability) of a terminal device can be considered, to perform cell selection or cell reselection for a non-terrestrial network, to ensure normal communication between the terminal device and a network device.

Figure 2:
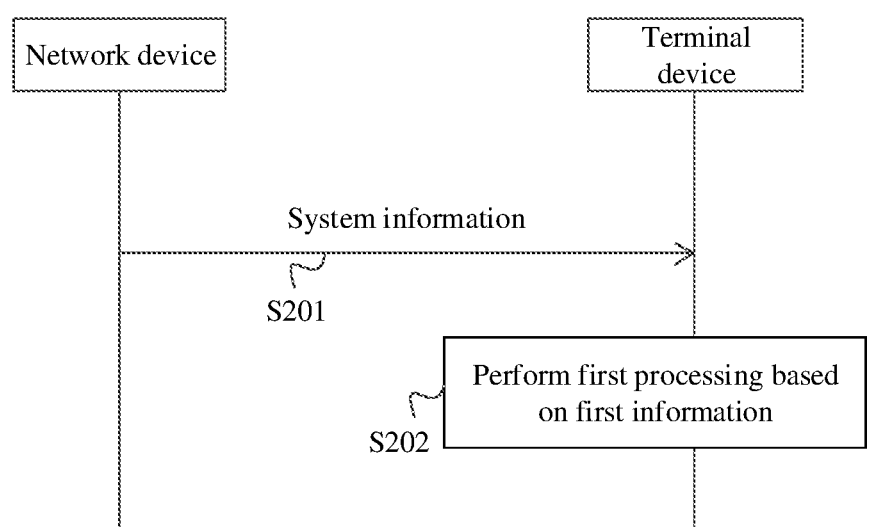
FIG. 2 is a signaling diagram of a communication method according to an embodiment.

FIG. 2 is a signaling diagram of a communication method according to an embodiment. This embodiment provides a communication method. The method in this embodiment may be applied to a terminal device and a network device. As shown in FIG. 2, the method in this embodiment includes the following steps.

S201. The network device sends system information to the terminal device.

The system information includes first information. The terminal device is located in a first cell, and the first cell corresponds to the network device. Herein, that the first cell corresponds to the network device means that the first cell is an area covered by the network device (or signals of the network device) or a part of the signals of the network device.

It may be understood that the first information is used to indicate a sending capability that the terminal device located in the first cell or a neighboring cell of the first cell needs to have, or the first information is used to indicate a receiving capability of the first cell or a neighboring cell of the first cell. Both the sending capability and the receiving capability may be understood as follows: After a connection is established between the network device and the terminal device, uplink data sent by the terminal device can be received by the network device, and downlink data sent by the network device can be received by the terminal device. That is, the network device and the terminal device can normally communicate with each other.

Correspondingly, the terminal device receives the system information in the first cell.

Optionally, the system information may be a master information block (MIB), a system information block 1 (SIB 1), or an other system information block (OSI).

S202. The terminal device performs first processing based on the first information.

Optionally, the first processing is cell selection or cell reselection.

The terminal device determines whether the sending capability of the terminal device meets the first information. If the sending capability of the terminal device meets the first information, the terminal device performs the cell selection or the cell reselection based on a cell indicated by the first information. Alternatively, if the sending capability of the terminal device does not meet the first information, a cell indicated by the first information is not considered during the cell selection or the cell reselection, that is, the cell indicated by the first information is abandoned.

For different content included in the first information, the following describes how the terminal device performs the cell selection or the cell reselection based on the first information.

In an optional implementation, the first information may include at least one of the following:

a minimum received signal power corresponding to the first cell;

an uplink transmit power threshold corresponding to the first cell;

a characteristic of the first cell; and neighboring cell information of the first cell.

The minimum received signal power corresponding to the first cell may also be referred to as receiver sensitivity corresponding to the first cell, and both the minimum received signal power and the receiver sensitivity are used to indicate a minimum received signal power of the network device to which the first cell belongs. Herein, the receiver sensitivity corresponding to the first cell may be understood as sensitivity of a receiver of the network device corresponding to the first cell. Further, in a scenario in which the network device covers a plurality of cells, receiver sensitivity corresponding to each of the plurality of cells is the same.

Optionally, the characteristic of the first cell includes a physical characteristic of the first cell. The physical characteristic may include, for example, one or more of a type of a platform of the network device, a height at which the network device is located, or a delay characteristic of the network device. Optionally, the delay characteristic may include but is not limited to a high delay, a low delay, or a specific value. For example, the type of the platform of the network device may include a GEO satellite, a non-geostationary earth orbit (NGEO) satellite, a low earth orbit (LEO) satellite, a medium earth orbit (MEO) satellite, a UAS, and the like.

On the foregoing basis, in a possible implementation, the first information includes the minimum received signal power corresponding to the first cell. In this case, that the terminal device performs cell selection based on the first information may include: determining whether a maximum transmit power of the terminal device is not less than (or greater than or equal to) a sum of the minimum received signal power corresponding to the first cell and a first threshold. Optionally, if the maximum transmit power of the terminal device is not less than (or greater than or equal to) the sum of the minimum received signal power corresponding to the first cell and the first threshold, the first cell is determined as a camped cell. Alternatively, if the maximum transmit power of the terminal device is less than or equal to (or not greater than) the sum of the minimum received signal power corresponding to the first cell and the first threshold, the first cell is determined as a non-camped cell, that is, the first cell is abandoned.

The first threshold is determined based on first path loss information, and the first path loss information is path loss information corresponding to the first cell. Further, optionally, the first path loss information is determined by the terminal device.

For example, it is assumed that $P\_max$ is the maximum transmit power of the terminal device, $P\_min$ is the minimum received signal power corresponding to the first cell, and PL is the first path loss information. Optionally, the terminal device may obtain PL by evaluating a power of a received downlink reference signal. For example, if $P\_max - PL \geq P\_min$, the first cell is determined as the camped cell. Otherwise, the first cell is abandoned. In the example, the first path loss information is a specific value, and the first path loss information is equal to the first threshold. However, this is not limited in this embodiment.

This implementation ensures that only a terminal device whose maximum transmit power meets a requirement can camp on the first cell, and a height of the first cell may be relatively high.

In another possible implementation, the first information includes the uplink transmit power threshold corresponding to the first cell. In this case, that the terminal device performs cell selection based on the first information may include: determining whether a maximum transmit power of the terminal device is greater than or equal to the uplink transmit power threshold corresponding to the first cell, or determining whether a maximum transmit power of the terminal device is less than the uplink transmit power threshold corresponding to the first cell. Optionally, if the maximum transmit power of the terminal device is greater than or equal to the uplink transmit power threshold corresponding to the first cell, the first cell is determined as a camped cell. Alternatively, if the maximum transmit power of the terminal device is less than the uplink transmit power threshold corresponding to the first cell, the first cell is determined as a non-camped cell, that is, the first cell is abandoned. In another possible implementation, in a scenario in which a maximum transmit power is equal to the uplink transmit power threshold corresponding to the first cell, the first cell may also be determined as a non-camped cell.

For example, it is assumed that P_max is the maximum transmit power of the terminal device, and P_threshold is the uplink transmit power threshold corresponding to the first cell. For example, if P_max≥P_threshold, the first cell is determined as the camped cell. Otherwise, the first cell is abandoned.

This implementation ensures that only a terminal device whose maximum transmit power meets a requirement can camp on the first cell, and a height of the first cell may be relatively high.

In still another possible implementation, the first information includes the characteristic of the first cell. In this case, that the terminal device performs cell selection based on the first information may include: determining whether the terminal device supports the characteristic of the first cell. Optionally, if the terminal device supports the characteristic of the first cell, the first cell is determined as a camped cell. Alternatively, if the terminal device does not support the characteristic of the first cell, the first cell is determined as a non-camped cell, that is, the first cell is abandoned. Further, a height at which the network device is located is used as an example. If the terminal device supports the height at which the network device is located and that corresponds to the first cell, the first cell is determined as the camped cell. Alternatively, the type of the platform of the network device is the UAS, or the platform of the network device is of a UAS type. If the terminal device supports the UAS, the first cell is determined as the camped cell. For another example, the delay characteristic of the network device is the high delay. If the terminal device supports the high delay, the first cell is determined as the camped cell. A delay may be a one-way or round-trip delay from the terminal device to a satellite. Alternatively, the delay may be a one-way or round-trip delay from the terminal device to a core network device or a convergence unit (CU) through a satellite.

This implementation ensures that the terminal device camps on the first cell and works normally in the first cell.

Based on the foregoing implementations, optionally, that the terminal device performs cell selection based on the first information may further include: determining whether the first cell meets a first criterion. Further, if the first cell meets the first criterion and the terminal device meets a requirement in any one of the foregoing implementations, the first cell is determined as a camped cell. Otherwise, the first cell is abandoned. The requirement in any one of the foregoing implementations may include any one of the following: the maximum transmit power of the terminal device is greater than or equal to the uplink transmit power threshold corresponding to the first cell, the terminal device supports the characteristic of the first cell, the maximum transmit power of the terminal device is greater than the sum of the minimum received signal power corresponding to the first cell and the first threshold.

Optionally, the first criterion is an S criterion. For related descriptions of the S criterion, refer to descriptions in a conventional technology or content of the embodiments. Details are not described herein again. Optionally, the first criterion may alternatively be another criterion used to determine whether to perform the cell selection. Content of the first criterion is not limited in this embodiment. The first criterion is introduced to clarify that in addition to the first information, there is another determining criterion used for performing the cell selection.

Thus, the foregoing embodiments provide several implementations in which the terminal device performs the cell selection based on the first information.

It should be understood that the foregoing characteristics are not only used for the cell selection or the cell reselection, but also may be used for other purposes.

In an optional implementation, the foregoing neighboring cell information may include at least one of the following:
a minimum received signal power corresponding to a second cell;
an uplink transmit power threshold corresponding to the second cell; and
a characteristic of the second cell, where
the second cell is a neighboring cell of the first cell.

The minimum received signal power corresponding to the second cell may also be referred to as receiver sensitivity corresponding to the second cell, and both the minimum received signal power and the receiver sensitivity are used to indicate a minimum received signal power of the network device to which the second cell belongs.

Optionally, the characteristic of the second cell includes a physical characteristic of the second cell. For related descriptions about the physical characteristic, refer to the foregoing descriptions. Details are not described herein again.

It should be understood that, in this embodiment, the neighboring cell information is a basis for the terminal device to perform the cell reselection. Details are as follows.

In a first possible implementation, the neighboring cell information includes the minimum received signal power corresponding to the second cell. In the implementation, that the terminal device performs cell reselection based on the first information may include: determining whether a maximum transmit power of the terminal device is greater than or equal to (or not less than) a sum of the minimum received signal power corresponding to the second cell and a second threshold. Optionally, if the maximum transmit power of the terminal device is greater than or equal to (or not less than) the sum of the minimum received signal power corresponding to the second cell and the second threshold, the cell reselection may be performed to the second cell. Alternatively, if the maximum transmit power of the terminal device is less than the sum of the minimum received signal power corresponding to the second cell and the second threshold, the second cell is not used as a candidate cell for the terminal device to perform the cell reselection, that is, the second cell is abandoned. That "the cell reselection may be performed to the second cell" herein may be understood as that if the second cell also meets the second criterion, the cell reselection is performed by the terminal device to the second cell. Alternatively, if whether the second criterion is met cannot be determined, or a determining step of the second criterion is not executed, or the second criterion is not met, the second cell may be used as a candidate cell for performing the cell reselection. For the second criterion, refer to the following explanation.

The second threshold is determined based on second path loss information, and the second path loss information is path loss information corresponding to the second cell.

Further, optionally, the second path loss information is determined by the terminal device.

For an example, refer to the foregoing example in which the first information includes the minimum received signal power corresponding to the first cell. Details are not described herein again.

This implementation ensures that the cell reselection is performed to the second cell only by a terminal device whose maximum transmit power meets a requirement, and a height of the second cell may be relatively high.

In a second possible implementation, the neighboring cell information includes the uplink transmit power threshold corresponding to the second cell. In the implementation, that the terminal device performs cell reselection based on the first information may include: determining whether a maximum transmit power of the terminal device is greater than or equal to the uplink transmit power threshold corresponding to the second cell or determining whether a maximum transmit power of the terminal device is less than the uplink transmit power threshold corresponding to the second cell. Optionally, if the maximum transmit power of the terminal device is greater than or equal to the uplink transmit power threshold corresponding to the second cell, the cell reselection may be performed to the second cell. Alternatively, if the maximum transmit power of the terminal device is less than the uplink transmit power threshold corresponding to the second cell, the second cell is not used as a candidate cell for the terminal device to perform the cell reselection, that is, the second cell is abandoned.

For an example, refer to the foregoing example in which the first information includes the uplink transmit power threshold corresponding to the first cell. Details are not described herein again.

This implementation ensures that the cell reselection is performed to the second cell only by a terminal device whose maximum transmit power meets a requirement, and a height of the second cell may be relatively high.

In a third possible implementation, the neighboring cell information includes the characteristic of the second cell. In the implementation, that the terminal device performs cell reselection based on the first information may include: determining whether the terminal device supports the characteristic of the second cell. Optionally, if the terminal device supports the characteristic of the second cell, the cell reselection may be performed to the second cell. Alternatively, if the terminal device does not support the characteristic of the second cell, the terminal device does not use the second cell as a candidate cell to perform the cell reselection, that is, the second cell is abandoned. Further, a height at which the network device is located is used as an example. If the terminal device supports a height at which the network device is located and that corresponds to the second cell, the cell reselection is performed to the second cell. An implementation is as described above.

This implementation ensures that the cell reselection is performed by the terminal device to the second cell, and the terminal device works normally in the second cell.

Based on the foregoing implementation, optionally, that the terminal device performs cell reselection based on the first information may further include: determining whether the second cell meets a second criterion. Further, if the second cell meets the second criterion, and the terminal device meets a requirement in any one of the foregoing embodiments, the cell reselection may be performed to the second cell. Otherwise, the second cell is abandoned. The requirement in any one of the foregoing embodiments may include any one of the following: the maximum transmit power of the terminal device is greater than or equal to the uplink transmit power threshold corresponding to the second cell, the terminal device supports the characteristic of the second cell, and the maximum transmit power of the terminal device is greater than or equal to (or not less than) the sum of the minimum received signal power corresponding to the second cell and the second threshold.

Optionally, the second criterion is an existing reselection criterion. For related descriptions of the existing reselection criterion, refer to descriptions in the conventional technology or content of the embodiments. Details are not described herein again. Optionally, the second criterion may be another criterion used to determine whether to perform the cell reselection. Content of the second criterion is not limited in this embodiment. The second criterion is introduced to clarify that in addition to the first information, there is another determining criterion used for performing the cell reselection.

Thus, the foregoing embodiments provide several implementations in which the terminal device performs the cell reselection based on the first information.

In addition, the foregoing embodiments are all based on a case in which the terminal device supports an NTN. Because the NTN is introduced in 3GPP Release 16 (R16), some conventional terminal devices in the earlier versions may not support the NTN. In addition, even if the terminal device supports the NTN, the terminal device may support only a low-height NTN. Therefore, considering existence of these terminal devices, the communication method provided in this embodiment may further include the following implementation.

Further, the system information may include second information, and the second information may include at least one of the following: first indication information and second indication information. The first indication information is used to indicate whether access of a first-type terminal device to the first cell is supported, the second indication information is used to indicate a status of the first cell, and the status of the first cell indicates whether the first cell is a reserved cell. Optionally, the first information and the second information may be carried in same system information, or the first information and the second information may be carried in different system information. This is not limited in this embodiment. Optionally, the first-type terminal device is a conventional terminal device, in other words, a terminal device that does not support the NTN.

In a possible implementation, the second information includes the first indication information, and the first indication information indicates that the access of the first-type terminal device to the first cell is supported; and/or the second information includes the second indication information, and the second indication information indicates that the first cell is a non-reserved cell or is not the reserved cell.

It may be understood that the terminal device is the first-type terminal device, and the terminal device detects the first indication information to determine whether the access of the first-type terminal device to the first cell is supported. Further, if the first indication information indicates that accessed of the first-type terminal device to the first cell is not supported, the first cell is abandoned. Alternatively, if the first indication information indicates that the access of the first-type terminal device to the first cell is supported, the terminal device determines, based on the second indication information (where the second information includes the second indication information) and/or the foregoing steps related to the cell selection performed by the terminal device, whether the first cell is the camped cell.

Alternatively, the terminal device is not the first-type terminal device, regardless of whether the first indication information is received, or regardless of whether the first indication information indicates that access of the first-type terminal device is supported, the terminal device determines, based on the second indication information (where the second information includes the second indication information) and/or the foregoing steps related to the cell selection performed by the terminal device, whether the first cell is the camped cell. Further, the following scenarios are included.

If the second indication information indicates that the first cell is the reserved cell, for example, an NTN cell, and the terminal device supports the NTN, the terminal device determines that the first cell is the camped cell.

Alternatively, the second indication information indicates that the first cell is the non-reserved cell or is not the reserved cell, and determining is performed based on the second indication information. For example, if the second indication information indicates that the first cell is reserved for another purpose, the first cell is abandoned.

Alternatively, if the second indication information is not received or the second indication information does not exist, the terminal device determines that the first cell is the camped cell.

In addition, both the first indication information and the second indication information may be expressed in an explicit expression form or an implicit expression form. The explicit expression form means that information is expressed in an explicit manner in the system information. For example, a specific information element is occupied, and different preset values of the information element are used to indicate whether the access of the first-type terminal device to the first cell is supported. The implicit expression form means that information is expressed in an implicit manner in the system information. For example, when the system information does not include the first indication information, the terminal device considers by default that the access of the first-type terminal device to the first cell is supported, the terminal device considers by default that the access of the first-type terminal device to the first cell is not supported, or the like.

In another possible implementation, the system information includes third information, and the third information may include at least one of the following: third indication information and fourth indication information. The third indication information is used to indicate whether the access of the first-type terminal device to the second cell is supported, the fourth indication information is used to indicate a status of the second cell, and the status of the second cell indicates whether the second cell is a reserved cell. As described above, optionally, the first information and the third information, or the second information and the third information may be carried in same system information, or may be carried in different system information. This is not limited in this embodiment. Optionally, the first-type terminal device is the conventional terminal device, in other words, the terminal device that does not support the NTN.

Optionally, the third information includes the third indication information, and the third indication information indicates that the access of the first-type terminal device to the second cell is supported; and/or the third information includes the fourth indication information, and the fourth indication information indicates that the second cell is a non-reserved cell or is not the reserved cell.

For explanations and descriptions of the third indication information and the fourth indication information, refer to the foregoing descriptions of the first indication information and the second indication information. A difference lies in that the first indication information and the second indication information are a basis for the terminal device to perform the cell selection. The third indication information and the fourth indication information are a basis for the terminal device to perform the cell reselection.

Before performing the cell selection, the terminal device may predetermine, by using the first indication information and/or the second indication information, whether a type of the terminal device is a type of a terminal device whose access is allowed in the first cell. If the type of the terminal device is the type of the terminal device whose access is allowed in the first cell, a cell selection process is further performed based on the first information. Otherwise, the first cell is abandoned. Similarly, before performing the cell reselection, the terminal device may predetermine, by using the third indication information and/or the fourth indication information, whether a type of the terminal device is a type of a terminal device whose access is allowed in the second cell. If the type of the terminal device is the type of the terminal device whose access is allowed in the second cell, a cell reselection process is further performed based on the first information. Otherwise, the second cell is abandoned.

In this embodiment, assistance information such as a receiving capability of the network device or the sending capability of the terminal device may be added to the system information. The assistance information includes the first information, so that when performing the cell selection or the cell reselection or performing other processing, the terminal device considers more determining conditions, to prevent some terminal devices with a low sending capability from camping on an NTN that cannot work. A solution for performing cell selection or cell reselection for a non-terrestrial network is provided, to ensure normal communication between the terminal device and the network device.

In a possible solution, the terminal device determines, based on the first information, whether to enable a hybrid automatic repeat request (HARQ) function. In the non-terrestrial network, because a transmission delay is relatively long, after starting a HARQ process, a sender waits for an acknowledgement (ACK) message for a relatively long time, and a quantity of HARQ processes simultaneously supported by the terminal device is limited. Consequently, data transmission is interrupted for a very long time period to wait for the ACK message, and a data transmission rate is affected. Therefore, when the delay is relatively long (for example, the delay is greater than or equal to a preset delay, where the preset delay may be set based on an actual situation), a HARQ process with the relatively long delay may be selected to be disabled.

Further, the terminal device determines, based on the first information, whether to enable or disable the HARQ function.

Optionally, the first information includes fifth indication information, and the fifth indication information is used to indicate whether the terminal device uses the HARQ function. Optionally, the fifth indication information may be summarized as the characteristic mentioned in the foregoing embodiment.

For example, the first information includes a characteristic of a cell, and the cell herein usually refers to any cell. The characteristic may include a height, a delay characteristic, a type of a platform on which the network device is located, and the like. The terminal device determines, based on the characteristic of the cell, whether to enable or disable the HARQ function. For example, if the type of the platform in which the network device corresponding to the cell is located is the GEO satellite, the HARQ function is enabled or disabled. Otherwise, the HARQ function is disabled or enabled. For another example, if the height at which the network device is located and that corresponds to the cell is greater than a preset height, the HARQ function is enabled. Otherwise, the HARQ function is disabled. Details are not described herein.

In this embodiment, the assistance information such as the receiving capability of the network device or the sending capability of the terminal device is added to the system information, so that more determining conditions are considered when the terminal device performs data transmission with the network device. This avoids an excessively long data transmission delay and ensures the data transmission rate between the terminal device and the network device.

The foregoing describes in detail the communication method provided in the embodiments. The following describes a communications apparatus provided in the embodiments.

Figure 3:
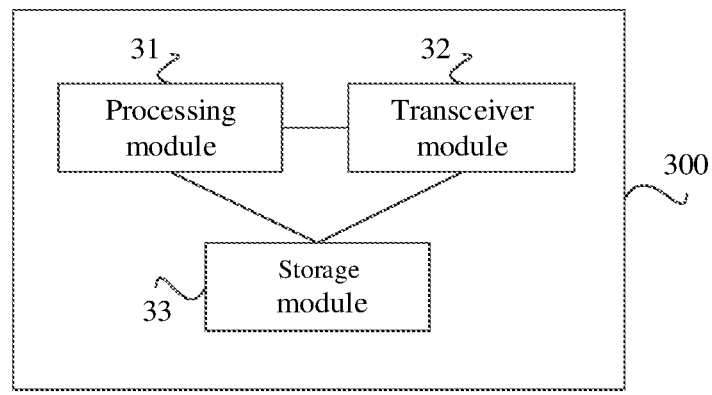
FIG. 3 is a schematic structural diagram of a communications apparatus according to an embodiment.

In an example, FIG. 3 is a schematic block diagram of a communications apparatus according to an embodiment.

A communications apparatus 300 in this embodiment may be the terminal device in the foregoing method embodiment or may be one or more chips in the terminal device. The communications apparatus 300 may be configured to perform some or all functions of the terminal device in the foregoing method embodiment. The communications apparatus 300 may include a processing module 31 and a transceiver module 32. Optionally, the communications apparatus 300 may further include a storage module 33. The transceiver module 32 herein may be an independently disposed receiving module and sending module, or may be a transceiver module with an integrated receiving and sending function.

For example, the transceiver module 32 may be configured to perform the step of "receiving system information from a first cell" in the foregoing method embodiment. The processing module 31 may be configured to perform the step of "performing cell selection or cell reselection based on the first information" in the foregoing method embodiment.

Alternatively, the communications apparatus 300 may also be configured as a universal processing system. For example, the universal processing system is usually referred to as a chip. The processing module 31 may include one or more processors that provide a processing function. The transceiver module 32 may be, for example, an input/output interface, a pin, a circuit, or a transceiver. The input/output interface may be used for information interaction between a chip system and the outside. For example, the input/output interface may output a matching result obtained by the processing module 31 to another module outside the chip for processing. The transceiver may be an independently disposed receiver and transmitter, or may be a transceiver that integrates a transceiver function. The processing module 31 may execute a computer-executable instruction stored in the storage module 33, to implement a function of the terminal device in the foregoing method embodiment. In an example, the optionally included storage module 33 in the communications apparatus 300 may be a storage unit in the chip, for example, a register or a cache. The storage module 33 may also be a storage unit that is inside the terminal device and that is located outside the chip, for example, a read-only memory (ROM) or another type of static storage device that can store static information and instructions, a random access memory (RAM), or the like.

Alternatively, the communications apparatus 300 in this embodiment may be the network device in the foregoing method embodiment or may be one or more chips in the network device. The communications apparatus 300 may be configured to perform some or all functions of the network device in the foregoing method embodiments. The communications apparatus 300 may include a processing module 31 and a transceiver module 32. Optionally, the communications apparatus 300 may further include a storage module 33.

For example, the transceiver module 32 may be configured to perform the step of "sending system information" in the foregoing method embodiment.

Alternatively, the communications apparatus 300 may also be configured as a universal processing system. For example, the universal processing system is usually referred to as a chip. The processing module 31 may include one or more processors that provide a processing function. The transceiver module 32 may be, for example, an input/output interface, a pin, or a circuit. The input/output interface may be used for information interaction between the chip system and the outside. For example, the input/output interface may output a matching result obtained by the processing module 31 to another module outside the chip for processing. The processing module 31 may execute a computer-executable instruction stored in the storage module 33, to implement a function of the network device in the foregoing method embodiment. In an example, the optionally included storage module 33 in the communications apparatus 300 may be a storage unit in the chip, for example, a register or a cache. The storage module 33 may also be a storage unit that is inside the network device and that is located outside the chip, for example, a ROM or another type of static storage device that can store static information and instructions, a RAM, or the like.

Figure 4:
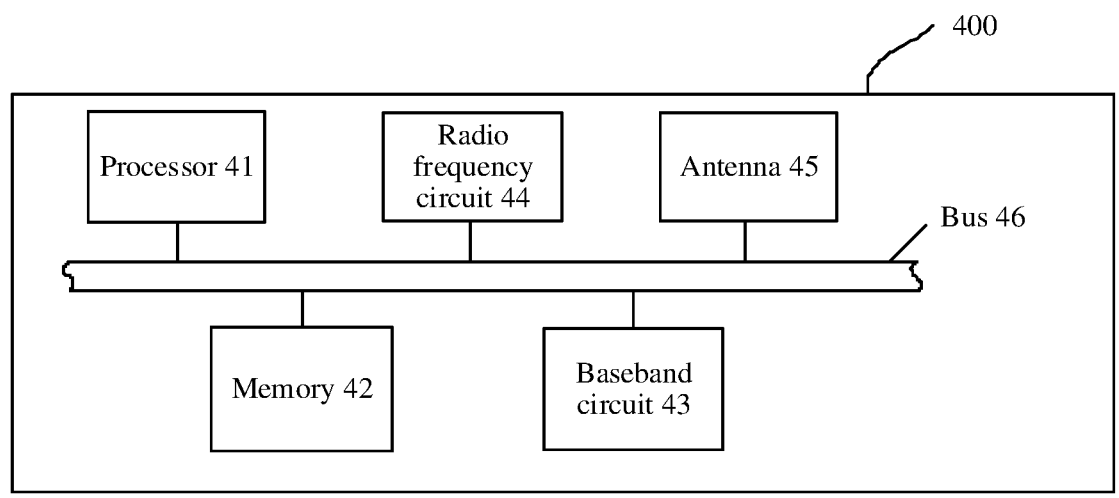
FIG. 4 is a schematic structural diagram of a communications apparatus according to another embodiment.

In another example, FIG. 4 is a schematic block diagram of a communications apparatus according to another embodiment.

The communications apparatus 400 in this embodiment may be the terminal device in the foregoing method embodiment, and the communications apparatus 400 may be configured to perform some or all functions of the terminal device in the foregoing method embodiments. The communications apparatus 400 may include a processor 41, a baseband circuit 43, a radio frequency circuit 44, and an antenna 45. Optionally, the communications apparatus 400 may further include a memory 42. Optionally, the components of the communications apparatus 400 are coupled together by using a bus 46. The bus 46 further includes a power bus, a control bus, and a status signal bus, in addition to a data bus. However, for clear description, various types of buses in the figure are marked as the bus 46.

The processor 41 may be configured to control the terminal device, and perform processing that is performed by the terminal device in the foregoing embodiments. The processor 41 may perform processing processes related to the terminal device in the foregoing method embodiment and/or may be used for other processes of the technology described in the embodiments, and may further run an operating system, manage the bus, and execute a program or instructions stored in the memory.

The baseband circuit 43, the radio frequency circuit 44, and the antenna 45 may be configured to support information receiving and sending between the terminal device and another entity (for example, the network device or another terminal device) in the foregoing embodiments, to support wireless communication between the terminal device and the another entity.

The memory 42 may be configured to store program code and data of the terminal device, and the memory 42 may be the storage module 33 in FIG. 3. It may be understood that the baseband circuit 43, the radio frequency circuit 44, and the antenna 45 may be further configured to support the terminal device to communicate with the another entity, for example, to support the terminal device to communicate with the network device. In FIG. 4, the memory 42 is shown as separated from the processor 41. However, it is readily figured out by a person skilled in the art that the memory 42 or any part of the memory 42 may be located outside the communications apparatus 400. For example, the memory 42 may include a transmission line and/or a computer product that is separated from a wireless node. All these media can be accessed by the processor 41 through the bus 46. Alternatively, the memory 42 or any part of the memory 42 may be integrated into the processor 41, for example, may be a high-speed cache and/or a general purpose register.

It may be understood that FIG. 4 shows only a simplified implementation of the terminal device. For example, in actual application, the terminal device may include any quantity of transmitters, receivers, processors, memories, and the like. All terminal devices that can implement this application fall within the scope of the embodiments.

Alternatively, the communications apparatus 400 in this embodiment may be the network device in the foregoing method embodiment, and the communications apparatus 400 may be configured to perform some or all functions of the network device in the foregoing method embodiment. The communications apparatus 400 may include a processor 41, a baseband circuit 43, a radio frequency circuit 44, and an antenna 45. Optionally, the communications apparatus 400 may further include a memory 42. Optionally, the components of the communications apparatus 400 are coupled together by using a bus 46. The bus 46 further includes a power bus, a control bus, and a status signal bus, in addition to a data bus. However, for clear description, various types of buses in the figure are marked as the bus 46.

The processor 41 may be configured to control the network device, and perform processing that is performed by the network device in the foregoing embodiments. The processor 41 may perform processing processes related to the network device in the foregoing method embodiment and/or may be used for other processes of the technology described the embodiments, and may further run an operating system, manage the bus, and execute a program or instructions stored in the memory.

The baseband circuit 43, the radio frequency circuit 44, and the antenna 45 may be configured to support information receiving and sending between the network device and another entity (for example, the terminal device or another network device) in the foregoing embodiments, to support wireless communication between the network device and the another entity.

The memory 42 may be configured to store program code and data of the network device, and the memory 42 may be the storage module 33 in FIG. 3. It may be understood that the baseband circuit 43, the radio frequency circuit 44, and the antenna 45 may be further configured to support the network device to communicate with the another entity, for example, to support the network device to communicate with the terminal device. In FIG. 4, the memory 42 is shown as separated from the processor 41. However, it is readily figured out by a person skilled in the art that the memory 42 or any part of the memory 42 may be located outside the communications apparatus 400. For example, the memory 42 may include a transmission line and/or a computer product that is separated from a wireless node. All these media can be accessed by the processor 41 through the bus 46. Alternatively, the memory 42 or any part of the memory 42 may be integrated into the processor 41, for example, may be a high-speed cache and/or a general purpose register.

It may be understood that FIG. 4 shows only a simplified implementation of the network device. For example, in actual application, the network device may include any quantity of transmitters, receivers, processors, memories, and the like. All network devices that can implement this application fall within the scope of the embodiments.

In a possible implementation, the communications apparatus may alternatively be implemented by using the following: one or more field-programmable gate arrays (FPGA), a programmable logic device (PLD), a controller, a state machine, gate logic, a discrete hardware component, any other proper circuit, or any combination of circuits that can perform various functions described the embodiments.

The processor in the communications apparatus 400 may be a general-purpose processor, for example, a general-purpose central processing unit (CPU), a network processor (NP), or a microprocessor. The processor may also be an application-specific integrated circuit (ASIC), or one or more integrated circuits configured to control program execution in the solutions. The processor may also be a digital signal processor (DSP), an FPGA) or another programmable logic device, a discrete gate or a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations based on program instructions stored in the memory.

The memory in the communications apparatus 400 may further store an operating system and another application program. For example, the program may include program code, and the program code includes computer operation instructions. Further, the memory may be a ROM, another type of static storage device that can store static information and instructions, a RAM, another type of dynamic storage device that can store information and instructions, a magnetic disk memory, or the like. The memory may be a combination of the foregoing storage types. In addition, a computer-readable storage medium/the memory may be located in the processor, or may be located outside the processor, or distributed in a plurality of entities including the processor or a processing circuit. The computer-readable storage medium/memory may be embodied in a computer program product. For example, the computer program product may include a computer-readable medium in a packaging material.

An embodiment further provides a computer-readable storage medium. The computer-readable storage medium stores a computer program, the computer program includes at least one segment of code, and the at least one segment of code may be executed by a computer, to control the computer to perform the method according to any one of the foregoing embodiments.

An embodiment further provides a chip, including a processing module and a communications interface. The processing module can perform the method procedure in any method embodiment mentioned above. Further, the chip may further include a storage module (for example, a memory). The storage module is configured to store instructions, the processing module is configured to execute the instructions stored in the storage module, and the instructions stored in the storage module are executed to enable the processing module to perform the method procedure in any method embodiment mentioned above.

An embodiment provides a program or a computer program product including program instructions. When the program instructions are executed by a processor, the processor is enabled to implement the method procedure in any method embodiment mentioned above.

All or some of the program instructions may be stored in a storage medium that is encapsulated with the processor, or all or some of the program instructions may be stored in a memory that is not encapsulated with the processor.

Optionally, the processor may be a chip.

In the several embodiments provided, it should be understood that the disclosed system, apparatuses, and method may be implemented in other manners. For example, the described apparatus embodiments are merely examples. For example, division into units is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

What is claimed is:

1. A method, applied to a terminal device, the method comprising:
   receiving system information from a first cell of a network device deployed on a high-altitude platform or a satellite wherein the system information comprises first information including at least a minimum received signal power corresponding to the first cell; and
   performing cell selection or cell reselection based on the first information by continuously measuring the first cell with the terminal device and determining whether a maximum transmit power of the terminal device is greater than or equal to a sum of the minimum received signal power corresponding to the first cell and a first threshold,
   wherein the first information comprises at least a type of a platform where the network equipment is located and the type of the platform where the network equipment is located is at least one of a geostationary earth orbit satellite, a non-geostationary earth orbit satellite, a low earth orbit satellite, a medium earth orbit satellite, and an unmanned aircraft system; and
   wherein the first threshold is determined based on first path loss information, and the first path loss information is path loss information corresponding to the first cell.

2. The method according to claim 1, wherein the first information further comprises a characteristic of the first cell; and the performing of cell selection based on the first information comprises:
   determining whether the terminal device supports the characteristic of the first cell.

3. The method according to claim 1, wherein the first information further comprises a neighboring cell information that comprises at least one of the following:
   a minimum received signal power corresponding to a second cell;
   an uplink transmit power threshold corresponding to the second cell; and
   a characteristic of the second cell, wherein the second cell is a neighboring cell of the first cell.

4. The method according to claim 3, wherein the neighboring cell information comprises the minimum received signal power corresponding to the second cell; and the performing of cell reselection based on the first information comprises:
   determining whether a maximum transmit power of the terminal device is greater than or equal to a sum of the minimum received signal power corresponding to the second cell and a second threshold, wherein the second threshold is determined based on second path loss information, and the second path loss information is path loss information corresponding to the second cell.

5. The method according to claim 3, wherein the neighboring cell information comprises the characteristic of the second cell; and the performing of cell reselection based on the first information comprises:
   determining whether the terminal device supports the characteristic of the second cell.

6. The method according to claim 4, wherein the performing of cell reselection based on the first information further comprises:
   determining whether the second cell meets a second criterion.

7. A method, applied to a network device deployed on a high-altitude platform or a satellite, wherein the method comprises:
   sending system information to a terminal device, wherein the system information comprises first information including at least a minimum received signal power corresponding to a first cell, the first information comprises a type of a platform where the network equipment is located and the type of the platform where the network equipment is located is at least one of a geostationary earth orbit satellite, a non-geostationary earth orbit satellite, a low earth orbit satellite, a medium earth orbit satellite, and an unmanned aircraft system; and
   performing cell selection or cell reselection based on the first information by continuously measuring the first cell with a terminal device and determining whether a maximum transmit power of the terminal device is greater than or equal to a sum of the minimum received signal power corresponding to the first cell and a first threshold;
   wherein the first threshold is determined based on first path loss information, and the first path loss information is path loss information corresponding to the first cell.

8. The method according to claim 7, wherein the first information further comprises a neighboring cell information that comprises at least one of the following:
- a minimum received signal power corresponding to a second cell;
- an uplink transmit power threshold corresponding to the second cell; and
- a characteristic of the second cell, wherein
- the second cell is a neighboring cell of the first cell.

9. An apparatus, comprising:
one or more processors, and
a memory configured to store program instructions;
wherein, when executed by the one or more processors, the instructions cause the apparatus to:
receive system information from a first cell of a network device deployed on a high-altitude platform or a satellite, wherein the system information comprises first information including at least a minimum received signal power corresponding to the first cell; and
perform cell selection or cell reselection based on the first information by continuously measuring the first cell with a terminal device and determining whether a maximum transmit power of the terminal device is greater than or equal to a sum of the minimum received signal power corresponding to the first cell and a first threshold,
wherein the first information comprises at least a type of a platform where the network equipment is located, and the type of the platform where the network equipment is located is at least one of a geostationary earth orbit satellite, a non-geostationary earth orbit satellite, a low earth orbit satellite, a medium earth orbit satellite, and an unmanned aircraft system; and
wherein the first threshold is determined based on first path loss information, and the first path loss information is path loss information corresponding to the first cell.

10. The apparatus according to claim 9, wherein the first information further comprises a characteristic of the first cell and the performance of cell selection or cell reselection based on the first information further comprises:
a determination of whether the apparatus supports the characteristic of the first cell.

11. The apparatus according to claim 9, wherein the first information further comprises a neighboring cell information that comprises at least one of the following:
- a minimum received signal power corresponding to a second cell;
- an uplink transmit power threshold corresponding to the second cell; and
- a characteristic of the second cell, wherein
- the second cell is a neighboring cell of the first cell.

12. The apparatus according to claim 11, wherein the neighboring cell information comprises the minimum received signal power corresponding to the second cell and the performance of cell selection or cell reselection based on the first information further comprises:
a determination of whether a maximum transmit power of the apparatus is greater than or equal to a sum of the minimum received signal power corresponding to the second cell and a second threshold, wherein
the second threshold is determined based on second path loss information, and the second path loss information is path loss information corresponding to the second cell.

13. The apparatus according to claim 11, wherein the neighboring cell information comprises the characteristic of the second cell and the performance of cell selection or cell reselection based on the first information further comprises:
a determination whether the apparatus supports the characteristic of the second cell.

14. The apparatus according to claim 12, wherein perform cell selection or cell reselection based on the first information comprises:
a determination of whether the second cell meets a second criterion.

15. An apparatus, comprises:
one or more processors, and
a memory configure to store program instructions;
wherein, when executed by the one or more processors, the instructions cause the apparatus to:
send system information to a network device deployed on a high-altitude platform or a satellite, wherein the system information comprises first information including at least a minimum received signal power corresponding to a first cell of a terminal device, the first information comprises at least a type of a platform where the network equipment is located, and the type of the platform where the network equipment is located is at least one of a geostationary earth orbit satellite, a non-geostationary earth orbit satellite, a low earth orbit satellite, a medium earth orbit satellite, and an unmanned aircraft system; and
perform cell selection or cell reselection based on the first information by continuously measuring the first cell with the terminal device and determining whether a maximum transmit power of the terminal device is greater than or equal to a sum of the minimum received signal power corresponding to the first cell and a first threshold;
wherein the first threshold is determined based on first path loss information, and the first path loss information is path loss information corresponding to the first cell.

16. The apparatus according to claim 15, wherein the first information further comprises a neighboring cell information that comprises at least one of the following:
- a minimum received signal power corresponding to a second cell;
- an uplink transmit power threshold corresponding to the second cell; and
- a characteristic of the second cell, wherein
- the second cell is a neighboring cell of the first cell.

* * * * *